(12) United States Patent
Cavalieri et al.

(10) Patent No.: US 8,178,632 B2
(45) Date of Patent: May 15, 2012

(54) PROPYLENE POLYMERS

(75) Inventors: Claudio Cavalieri, Ferrara (IT); Enrico Beccarini, Ferrara (IT); Camillo Cagnani, Ferrara (IT)

(73) Assignee: Basell Poliolefine Italia, s.r.l., Milan (IT)

( * ) Notice: Subject to any disclaimer, the term of this patent is extended or adjusted under 35 U.S.C. 154(b) by 0 days.

(21) Appl. No.: 12/309,579

(22) PCT Filed: Jun. 18, 2007

(86) PCT No.: PCT/EP2007/056000
§ 371 (c)(1),
(2), (4) Date: Jan. 23, 2009

(87) PCT Pub. No.: WO2008/012144
PCT Pub. Date: Jan. 31, 2008

(65) Prior Publication Data
US 2009/0192271 A1    Jul. 30, 2009

Related U.S. Application Data

(60) Provisional application No. 60/835,030, filed on Aug. 2, 2006.

(30) Foreign Application Priority Data

Jul. 28, 2006   (EP) .................................. 06118061

(51) Int. Cl.
*C08F 2/00* (2006.01)
*C08F 110/06* (2006.01)
*B01J 19/18* (2006.01)

(52) U.S. Cl. ........................................................ 526/65

(58) Field of Classification Search .................... 526/65, 526/72, 89, 90, 348
See application file for complete search history.

(56) References Cited

U.S. PATENT DOCUMENTS

| | | | |
|---|---|---|---|
| 3,740,380 A * | 6/1973 | Eichers et al. | 524/159 |
| 4,184,026 A * | 1/1980 | Carrock et al. | 523/322 |
| 4,399,054 A | 8/1983 | Ferraris et al. | |
| 4,469,648 A | 9/1984 | Ferraris et al. | |
| 4,971,937 A | 11/1990 | Albizzati et al. | |
| 5,221,651 A | 6/1993 | Sacchetti et al. | |
| 6,127,304 A | 10/2000 | Sacchetti et al. | |
| 6,323,152 B1 | 11/2001 | Sacchetti et al. | |
| 6,407,028 B1 | 6/2002 | Sacchetti et al. | |
| 6,437,061 B1 | 8/2002 | Sacchetti et al. | |
| 6,599,986 B2 | 7/2003 | Pelliconi et al. | |
| 6,686,307 B2 | 2/2004 | Sacchetti et al. | |
| 6,689,845 B1 | 2/2004 | Govoni et al. | |
| 6,800,710 B2 | 10/2004 | Pelliconi et al. | |
| 6,818,187 B2 | 11/2004 | Govoni et al. | |
| 6,818,583 B1 | 11/2004 | Morini et al. | |
| 6,825,309 B2 | 11/2004 | Morini et al. | |
| 6,906,155 B1 | 6/2005 | Minami et al. | |
| 7,022,640 B2 | 4/2006 | Morini et al. | |
| 7,049,377 B1 | 5/2006 | Morini et al. | |
| 7,169,871 B2 | 1/2007 | Morini et al. | |
| 7,544,758 B2 | 6/2009 | Minami et al. | |
| 2002/0156194 A1 * | 10/2002 | Pelliconi et al. | 525/240 |
| 2006/0172647 A1 * | 8/2006 | Mehta et al. | 442/327 |
| 2009/0029621 A1 * | 1/2009 | Sartori et al. | 442/401 |

FOREIGN PATENT DOCUMENTS

| | | |
|---|---|---|
| EP | 45977 | 2/1982 |
| EP | 91807 | 10/1983 |
| EP | 361494 | 4/1990 |
| EP | 395083 | 10/1990 |
| EP | 728769 | 8/1996 |
| EP | 764514 | 3/1997 |
| EP | 1095951 | 5/2001 |
| EP | 1206499 | 5/2002 |
| EP | 1272533 | 1/2003 |
| WO | 98/44009 | 10/1998 |
| WO | 00/02929 | 1/2000 |
| WO | WO 00/02929 * | 1/2000 |
| WO | WO 00/02929 A1 * | 1/2000 |
| WO | WO00/02929 A1 * | 1/2000 |
| WO | WO 0002929 A1 * | 1/2000 |
| WO | 00/63261 | 10/2000 |
| WO | 01/92406 | 12/2001 |
| WO | 02/051912 | 7/2002 |
| WO | 02/097503 | 12/2002 |
| WO | WO 2006009945 A1 * | 1/2006 |
| WO | 2006/120190 | 11/2006 |

\* cited by examiner

*Primary Examiner* — David W Wu
*Assistant Examiner* — Elizabeth Eng
(74) *Attorney, Agent, or Firm* — Dilworth IP LLC

(57) ABSTRACT

Propylene polymers having specific values of total comonomer content and melting temperature, articles obtained therefrom, in particular extrusion blow molded articles, and gas-phase process for obtaining said propylene polymers.

3 Claims, No Drawings

PROPYLENE POLYMERS

The present invention relates to propylene polymers having specific values of total comonomer content and of melting temperature, to articles obtained therefrom, in particular extrusion blow molded articles, and to the process for obtaining said propylene polymers.

It is widely known in the art that propylene copolymers can be conveniently used in extrusion processes, and in particular to obtain extrusion blow molded articles, because of their good balance of physical-mechanical properties. Propylene copolymers commonly used in extrusion processes are endowed with an acceptable stiffness, good impact properties especially at low temperatures and good optical properties, i.e. low haze values. The desired balance of properties in propylene copolymers suitable for extrusion processes is normally obtained by carefully dosing the comonomer content of the propylene copolymers. Increasing the comonomer content normally present is said copolymers brings about an improvement in the impact resistance of the copolymers while inevitably deteriorating the stiffness; lowering the comonomer content inevitably results in improved stiffness and worst impact resistance. The variation of the comonomer content has also a strong influence on the melting and crystallization temperature of propylene copolymers, the Tm and Tc being lowered by increasing the comonomer content and increased by lowering the comonomer content. For example, it is known from WO02/051912 that propylene copolymers having a total ethylene content of 1.4 wt % may have a melting temperature of more than 161° C. and the unpublished patent application PCT/EP2006/062152 discloses propylene-ethylene copolymers having an ethylene content in the range 4.5-7.0 wt % and a melting temperature lower than 143° C. Propylene polymers having an ethylene content around 5.0 wt % and a higher temperature are known from the European patent EP 1206499, in the name of the same applicant. The values of melting temperature disclosed in the Examples 1 and 2 are however referred to propylene polymers nucleated with 2000 ppm of di-benzilydenesorbitol.

In some extrusion processes, like extrusion blow molding, the productivity is strongly influenced by the cooling step and melting and crystallization temperatures of the resin are therefore of the uttermost importance for productivity.

It is an object of the present invention to provide propylene polymers having a good balance of physical-mechanical properties that can improve productivity of extrusion processes, in particular of extrusion blow molding processes.

Therefore, the present invention provides propylene polymers having a total content of units deriving from at least one linear or branched alpha-olefin having 2 to 8 carbon atoms other than propylene ranging from 4.5 to 6.0 wt %, preferably from 4.7 to 5.5 wt %, more preferably from 4.8 to 5.2 wt % and a melting temperature Tm (measured by DSC on the as-reactor polymer) ranging from 148° to 160° C., preferably from 150° to 158° C., more preferably from 153° C. to 156° C. The Tm values characterizing the propylene polymers of the invention should be measured on the "as-reactor polymer", i.e. on the polymer as such without adding any additive or filler, in particular without adding nucleating agents.

The propylene polymers may additionally have at least one feature of the following set:
melt flow rate (MFR) ranging from 0.1 to 25 g/10 min, preferably from 0.5 to 5 g/10 min and more preferably from 1.2 to 2.5 g/10 min. The desired MFR can be obtained directly on the "as reactor" polymers grades or, particularly for MFR higher than 5 g/10 min it can be obtained by visbreaking the "as reactor" grades according to the known techniques.
xylene soluble fraction at 25° C. lower than 15 wt %, more preferably lower than 12 wt %; and/or
Polydispersity Index (PI) value ranging from 3.0 to 9.0, more preferably from 4.0 to 6.0.

The at least one alpha-olefin is preferably selected from the group consisting of ethylene, 1-butene, 1-pentene, 1-hexene, 1-heptene, 1-octene, 4-methyl-1-pentene, ethylene being particularly preferred.

The propylene polymers of the present invention are obtainable by polymerizing propylene and the at least one linear or branched alpha-olefin having 2 to 8 carbon atoms other than propylene by a gas-phase polymerization process carried out in at least two interconnected polymerization zones, the process comprising feeding propylene and the at least one linear or branched alpha-olefin having 2 to 8 carbon atoms other than propylene to said polymerization zones in the presence of a highly stereospecific heterogeneous Ziegler-Natta catalyst system under reaction conditions and collecting the polymer product from said polymerization zones, in which process the growing polymer particles flow upward through one of said polymerization zones (riser) under fast fluidization conditions, leave said riser and enter another polymerization zone (downcomer) through which they flow downward under the action of gravity, leave said downcomer and are reintroduced into the riser, thus establishing a circulation of polymer between the riser and the downcomer, whereby means are provided which are capable of totally or partially preventing the gas mixture present in the riser from entering the downcomer and a gas and/or liquid mixture having a composition different from the gas mixture present in the riser is introduced into the downcomer, the process being further characterized in that:
the monomer feed ratio $C_x^-/(C_x^- + C_3^-)$ to the riser ranges from 0.050 to 0.150 mol/mol, preferably from 0.055 to 0.070 mol/mol.

In the polymerization process, the growing polymer flows through a first polymerization zone, represented by the riser, under fast fluidization conditions. The two polymerization zones are appropriately interconnected. The growing polymer and the gaseous mixture leaving the riser are conveyed to a separation zone whereby the gaseous mixture is separated from the growing polymer. From the separation zone, the growing polymer enters the second polymerization zone, represented by the downcomer, where the growing polymer flows in a densified form under the action of gravity. The growing polymer particles leave said second polymerization zone and are reintroduced into said first polymerization zone, thus establishing a circulation of polymer between the two polymerization zones. The material balance is maintained by feeding in monomers and catalysts and discharging polymer powder. Generally, the conditions of fast fluidization in the first polymerization zone is established by feeding the monomers gas mixture below the point of reintroduction of the growing polymer into said first polymerization zone. The velocity of the transport gas injected into the riser has to be higher than the transport velocity under the operating conditions, and depends on the gas density and the particle size distribution of the solid. It is preferably comprised between 0.5 and 15 m/s, more preferably between 0.8 and 5 m/s. Generally, the various catalyst components are fed to the riser through a line that is preferably placed in the lower part of the riser. However, they can be fed at any other point of the riser, as well as at any point of the downcomer or of the interconnecting sections. The gas mixture that is separated from the circulating solid in the separation zone must be totally or partially prevented to enter the downcomer. This can be achieved by feeding a gas and/or liquid into the downcomer through a line placed at a suitable point of said downcomer, preferably in the upper part thereof, through one or more introduction lines. The gas and/or liquid mixture to be fed into the downcomer should have an appropriate composition, different from that of the gas mixture present in the riser. The said gas and/or liquid mixture partially or totally replaces the gas mixture entrained with the polymer particles entering the downcomer. The flow rate of this gas feed can be regulated so that a flow of gas counter-current to the flow of polymer particles is originated in the downcomer, particularly at the top thereof, thus acting as a barrier to the gas mixture coming from the riser which is entrained among the polymer particles. According to a particularly preferred embodiment, the gas and/or liquid mixture of different composition to be fed into the downcomer is fed in partially or totally liquefied form. More preferably, said gas and/or liquid mixture consists of liquefied propylene.

Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases. The operating parameters such as, for example, the temperature are those that are usual in gas-phase olefin polymerization processes, for example between 50° C. and 120° C., preferably from 70° C. to 90° C. The process can be carried out under operating pressure of between 0.5 and 10 MPa, preferably between 1.5 and 6 MPa. The polymerization apparatus suitable for carrying out the process is described in details in the International Patent Application WO00/02929, in particular in FIG. 4. The molecular weight distribution of the growing polymers can be conveniently tailored by metering customary molecular weight regulators, particularly hydrogen, in different proportion into at least one polymerization zone, preferably into the riser.

In order to obtain the propylene polymers of the instant invention, the polymerization process must be carried out by feeding to the riser a monomer mixture characterized by a monomer feed ratio $C_x^-/(C_x^- + C_3^-)$ comprised in the narrow range of from 0.050 to 1.000 mol/mol, preferably from 0.055 to 0.070 mol/mol, where $C_x^-$ indicates the at least one alpha-olefin having 2 to 8 carbon atoms other than propylene used as comonomer for the preparation of the propylene polymers and $C_3^-$ indicates propylene. The Tm value of the polymer powders discharged from the polymerization reactor is constantly monitored by DSC measurements.

According to a preferred embodiment, in the process is carried out so that the hold-up in the riser ranges from 30 to 50 wt %, more preferably from 35 to 45 wt %, and the hold-up in the downcomer ranges from 50 to 70 wt %, preferably from 55 to 65 wt %. The hold-up, either in the riser or in the downcomer, is defined as the weight amount of polymer present in one polymerization zone; the "split hold-up" is expressed as percentage by weight with respect to the total amount of polymer present in the reactor, i.e. in the riser and in the downcomer. The amount of polymer present in the polymerization zones of the reactor is measured according to known techniques. The hold-up is constantly monitored and maintained in the above mentioned ranges during the polymerization reaction.

According to a particular embodiment of the present invention, the propylene polymer may comprise a mixture of propylene copolymers, said copolymers having different comonomer content. When the propylene polymers of the invention are produced according to the polymerization process described above, the propylene polymer may comprise (percentage based on the sum of components (I) and (II)):

(I) 30-50 wt %, more preferably 35-45 wt %, of a propylene copolymer with at least one linear or branched alpha-olefin having from 2 to 8 carbon atoms other than propylene, said copolymer containing from 3.6 to 15.0 wt %, preferably from 6.0 to 12.0 wt %, of units derived from the alpha-olefin (referred to the component (I)); and (II) 50-70 wt %, more preferably 55-65 wt %, of a propylene copolymer with at least one linear or branched alpha-olefin having from 2 to 8 carbon atoms other than propylene, said copolymer containing from 0.01 to 3.5 wt %, preferably from 0.9 to 2.0 wt % (referred to the component (II)) of units derived from the alpha-olefin, wherein the amount of the component (I) corresponds to the split holdup in the riser and the amount of the component (II) corresponds to the split holdup in the downcomer.

Preferably the component (I) and (II) comprise the same alpha-olefin, said alpha-olefin being preferably selected from the group mentioned in the foregoing.

The Ziegler-Natta catalysts suitable for producing the propylene polymers of the instant invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP 1272533 and in the international patent application WO00/63261.

Preferably, the solid catalyst component comprises Mg, Ti, halogen and an electron donor selected from esters of mono or polycarboxylic acids which can be either aliphatic or aromatic. Among esters of aliphatic acids, preferred are malonates, glutarates and the succinates disclosed in WO00/63261. Among esters of aromatic acids preferred are benzoates and phthalates disclosed in EP45977 and in particular of either diisobutylphathalate or dihexylphthalate or diethylphthalate and mixtures thereof.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under sting conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The internal donor can be added during the treatment with TiCl$_4$ and the treatment with the electron donor compound can be repeated one or more times. Generally, the succinate of formula (I) is used in molar ratio with respect to the MgCl$_2$ of from 0.01 to 1 preferably from 0.05 to 0.5. The preparation of catalyst components in spherical form is described for example in European patent application EP-A-395083 and in the International patent application WO98/44009. The solid catalyst components obtained according to the above method show a surface area (by B.E.T. method) generally between 20 and 500 m$^2$/g and preferably between 50 and 400 m$^2$/g, and a total porosity (by B.E.T. method) higher than 0.2 cm$^3$/g preferably between 0.2 and 0.6 cm$^3$/g. The porosity (Hg method) due to pores with radius up to 10.000 Å generally ranges from 0.3 to 1.5 cm$^3$/g, preferably from 0.45 to 1 cm$^3$/g.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as AlEt$_2$Cl and Al$_2$Et$_3$Cl$_3$.

Preferred external electron-donor compounds include silicon compounds, esters such as ethyl 4-ethoxybenzoate, heterocyclic compounds and particularly 2,2,6,6-tetramethyl piperidine and ketones. Another class of preferred external donor compounds is that of silicon compounds of formula R$_a^5$R$_b^6$Si(OR$^7$)$_c$, where a and b are integer from 0 to 2, c is an integer from 1 to 3 and the sum (a+b+c) is 4; R$^5$, R$^6$, and R$^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1,trifluoropropyl-metil-dimethoxysilane. The external electron donor compound is used in such an amount to give a molar ratio between the organo-aluminum compound and said electron donor compound of from 0.1 to 500.

The propylene polymers of the invention may further comprise at least one nucleating agent. Preferably, the propylene polymers comprise up to 2500 ppm, more preferably from 500 to 2000 ppm, of at least one nucleating agent.

The at least one nucleating agent can be selected among inorganic additives such as talc, silica or kaolin, salts of monocarboxylic or polycarboxylic acids, e.g. sodium benzoate or aluminum tert-butylbenzoate, dibenzylidenesorbitol or its C$_1$-C$_8$-alkyl-substituted derivatives such as methyldibenzylidenesorbitol, ethyldibenzylidenesorbitol or dimethyldibenzylidenesorbitol or salts of diesters of phosphoric acid, e.g. sodium or lithium 2,2'-methylenebis(4,6,-di-tert-butylphenyl)phosphate. Particularly preferred nucleating agents are 3,4-dimethyldibenzylidenesorbitol; aluminum-hydroxy-bis[2,2'-methylene-bis(4,6-di-t-butylphenyl)phosphate]; sodium or lithium 2,2'-methylene-bis(4,6-ditertbutylphenyl)phosphate and bicyclo[2.2.1]heptane-2,3-dicarboxylic acid, disodium salt (1R,2R,3R,4S). The at least one nucleating agent may be added to the propylene polymer by known methods, such as by melt blending the at least one nucleating agent and the propylene polymer under shear condition in a conventional extruder.

The propylene polymers of the invention further comprising a nucleating agent preferably have a crystallization temperature Tc (measured by DSC) equal to or higher than 110° C., more preferably ranging from 110° C. to 120° C., particularly preferably from 112° to 117° C. and/or a melting temperature Tm (measured by DSC) higher than 152° C., preferably ranging from 152° to 162° C.

It has been found that propylene polymers of the instant invention are particularly suitable for producing extrusion blow molded articles.

It is therefore a further object of the instant invention to provide a process for producing extrusion blow molded articles comprising the use of propylene polymers having a total content of units deriving from at least one linear or branched alpha-olefin having 2 to 8 carbon atoms other than propylene ranging from 4.5 to 6.0 wt %, preferably from 4.7 to 5.5 wt %, more preferably from 4.8 to 5.2 wt %, and melting temperature Tm (measured by DSC on the "as-reactor polymer") ranging from 148° to 160° C., preferably from 150° to 158° C., more preferably from 153° C. to 156° C.

In extrusion blow molding processes a hollow cylinder (parison) is extruded from the molten plastic material and clamped in a mold. The molten parison is subsequently expanded with air pressure, cooled and ejected. Flash is an inevitable by-product of the extrusion blow molding process and trim tooling is needed to remove the flash from the blow molded articles. The cooling step is therefore the rate limiting factor in the process and the cooling capacity of the molten material is of the uttermost importance in determining the minimum cycle time. It has been found that by using the propylene polymers of the invention the cycle time of extrusion blow molding processes can be significantly reduced with respect to the same processes wherein a conventional polypropylene is used.

It has been surprisingly found that propylene polymer having a total comonomer content comprised in the preferred range of from 4.7 to 5.5 wt % (with respect to the propylene polymer) are additionally endowed with a particularly advantageous impact/stiffness balance, the value of the Izod Impact strength at 0° C. (measured according to ISO 180/1A) being higher than 10 kJ/m$^2$, preferably comprised in the range from 10 to 50 kJ/m$^2$, more preferably from 15 to 45 kJ/m$^2$).

Beside nucleating agents, the propylene polymers of the present invention may further comprise additives commonly employed in the polyolefin field, such as antioxidants, light stabilizers, antacids, colorants, fillers and processing improvers, said additives being normally added to the propylene polymer in customary amounts according to methods well known in the art.

The properties referred to in the description and in the examples are measured according to the following methods. The examples are given to illustrate and not to limit the present invention.

Molar ratio of feed gasses: Determined by gas-chromatography

Comonomer (C2) content: By IR spectroscopy

Melt flow rate (MFR): Determined according to ISO 1133 (230° C., 2.16 Kg)

Melting and crystallization temperature (Tm and Tc): Determined by DSC according to ISO 11357/3, with a temperature variation of 20° C. per minute.

Polydispersity Index (P.I.)

Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=10^5/Gc$$

in which Gc is the crossover modulus which is defined as the value (expressed in Pa) at which G'=G" wherein G' is the storage modulus and G" is the loss modulus.

Xylene-Soluble Fraction (XS)

2.5 g of polymer and 250 mL of o-xylene are introduced in a glass flask equipped with a refrigerator and a magnetical stirrer. The temperature is raised in 30 minutes up to the boiling point of the solvent. The so obtained solution is then kept under reflux and sting for further 30 minutes. The closed flask is then kept for 30 minutes in a bath of ice and water and in thermostatic water bath at 25° C. for 30 minutes as well. The solid thus obtained is filtered on quick filtering paper and 100 ml of the filtered liquid is poured in a previously weighed aluminum container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Flexural modulus (MEF): Determined according to ISO 178

Izod impact strength: Determined according to ISO 180/1A at 23° and 0° C.

Ductile brittle transition temperature (DBTT): According to this method, the bi-axial impact resistance is determined through impact with an automatic, computerized striking hammer. The circular test specimens are obtained by cutting with circular hand punch (38 mm diameter) the plaques obtained as described below. The circular test specimens are conditioned for at least 12 hours at 23° C. and 50 RH and then placed in a thermostatic bath at testing temperature for 1 hour. The force-time curve is detected during impact of a striking hammer (5.3 kg, hemispheric punch with a ½" diameter) on a circular specimen resting on a ring support. The machine used is a CEAST 6758/000 type model no. 2. The DBTT is the temperature at which 50% of the samples undergoes fragile break when submitted to the above-mentioned impact test. The plaques for DBTT measurements, having dimensions of 127×127×1.5 mm are prepared according to the following method. The injection press is a Negri Bossi™ type (NB 90) with a clamping force of 90 tons. The mould is a rectangular plaque (127×127×1.5 mm). Main process parameters are reported below:

| Back pressure | bar | 20 |
| Injection time | sec | 3 |
| Maximum Injection pressure | MPa | 14 |
| Hydraulic injection pressure | MPa | 6-3 |
| First holding hydraulic pressure | MPa | 4 ± 2 |
| First holding time | sec | 3 |
| Second holding hydraulic pressure | MPa | 3 ± 2 |
| Second holding time | sec | 7 |
| Cooling time | sec | 20 |
| Mould temperature | ° C. | 60 |
| Melt temperature | ° C. | 220 to 280 |

Haze (on 1 mm Plaque)

According to the present method, 5×5 cm specimens are cut molded plaques of 1 mm thick and the haze value is measured using a Gardner photometric unit connected to a Hazemeter type UX-10 or an equivalent instrument having G.E. 1209 light source with filter "C". Reference samples of known haze are used for calibrating the instrument. The plaques to be tested are produced according to the following method. 75×75×1 mm plaques are molded with a GBF Plastiniector G235/90 Injection Molding Machine, 90 tons under the following processing conditions:

| Screw rotation speed | | rpm | 120 |
| Back pressure | | bar | 10 |
| Melt temperature | | ° C. | 260 |
| Injection time | | sec | 5 |
| Switch to hold pressure | | bar | 50 |
| First stage hold pressure | | bar | 30 |
| Second stage pressure | | bar | 20 |
| Hold pressure profile: | $1^{st}$ stage | sec | 5 |
| | $2^{nd}$ stage | sec | 10 |
| Cooling time | | sec | 20 |
| Mold water temperature | | ° C. | 40 |

Top Load For the test a Instron dynamometer was used, equipped with a balance of 0.2 gr accuracy and with a micrometer of 0.01 mm accuracy. After at least 10-hours conditioning at 23°±1° C. and 50% relative humidity, the bottle is settled between the two plates of the dynamometer and compressed with a stress velocity of the plate of 5 cm/min. The stress at collapse of the bottle is recorded and the value reported in N. The Top Load value is the mean value obtained from measurements repeated on 10 bottles.

Polymerization Equipment

For the Examples 1-3 according to the instant invention a gas-phase polymerization reactor comprising two interconnected polymerization zones, a riser and a downcomer, as described in the International patent application WO00/02929 was used to prepare the propylene polymers (A). The indicated amounts of ethylene and molecular weight regulator, i.e. hydrogen, were fed exclusively into the first polymerization zone (riser). The gas composition into the two polymerization zones was differentiated by means of a propylene barrier feed.

EXAMPLES 1 TO 3

The solid catalyst used to prepare the propylene polymers was prepared according to the Example 5, lines 48-55 of the European Patent EP728769. Triethylaluminium (TEAL) was used as co-catalyst and dicyclopentyldimethoxysilane as external donor. The propylene polymers were prepared in one single polymerization step by feeding the monomers and the catalyst system to the polymerization equipment indicated above. The polymer powders were subjected to a steam treatment to remove the unreacted monomers, dried and subject to the analysis reported in Table 1 together with the polymerization conditions.

On Table 2 are reported the characterization data measured on the compositions obtained by mixing the polymer powders of the Examples 1 to 3 with 900 ppm of ADK-NA21 (supplied by Adeka Palmarole) in a Werner 53 extruder. Moreover, from the said compositions were prepared, through blow molding technique, bottles (35 g) that were tested for impact (4° C.) and top load properties.

TABLE 1

| | | Ex. 1 | Ex. 2 | Ex. 3 |
|---|---|---|---|---|
| TEAL/external donor | wt/wt | 3.8 | 3.9 | 3.0 |
| TEAL/catalyst | wt/wt | 5.0 | 5.0 | 5.0 |
| Temperature | ° C. | 75 | 70 | 75 |
| Pressure | barg | 24 | 22 | 24 |
| Split holdup    riser | wt % | 38 | 35 | 34 |
| downcomer | wt % | 62 | 65 | 66 |
| $C_3^-$ riser | mole % | 66 | 70.5 | / |
| $C_2^-$ riser | mole % | 8 | 4.9 | / |
| $H_2/C_3^-$ riser | mol/mol | / | 0.030 | 0.006 |
| $C_2^-/(C_2^- + C_3^-)$ | mol/mol | / | 0.065 | 0.050 |

TABLE 1-continued

|  |  | Ex. 1 | Ex. 2 | Ex. 3 |
| --- | --- | --- | --- | --- |
| Analysis on polymer powder |  |  |  |  |
| MFR | g/10 min | 2.0 | 2.4 | 0.9 |
| $C_2$ total content | wt % | 4.7 | 5 | 4.8 |
| XS | wt % | 12.8 | 11.5 | 12.1 |
| Polydispersity Index |  | 4.4 | 4.8 | 4.2 |
| Tm | °C. | 151.8 | 151.5 | 149.0 |
| Tc | °C. | 101 | 97.4 | 99.8 |

COMPARATIVE EXAMPLE 1

On the same Table 2 are reported the characterization data of a conventional propylene/ethylene copolymer suitable for extrusion blow molding present on the market and produced by Basell in a conventional loop reactor. The copolymer was melt blended in a Werner 53 extruder with 1800 ppm of Millad 3988. The MFR value of the copolymer was of 1.5 g/10 min.

COMPARATIVE EXAMPLE 2

According to the disclosure of the European EP1206499, a propylene polymer composition was prepared using the same solid catalyst of Example 2. Triethylaluminium (TEAL) was used as co-catalyst. The polymerization reaction was carried out as described in the above mentioned example by feeding the monomers into a first liquid phase reactor operated at a temperature of 70° C. equipped with devices suitable for transferring the growing polymers together with the unreacted monomers and the catalyst system into a second gas phase reactor wherein the polymerization reaction was completed at a temperature of 80° C. by feeding a suitable amount of fresh monomers. Hydrogen was used as molecular weight regulator. The as-reactor propylene polymer composition had a melting temperature of 145.4° C. and comprised 86 wt % of a propylene-ethylene copolymer containing 3.0 wt % of units deriving from ethylene and 14 wt % of a propylene-ethylene copolymer containing 16.3 wt % of units deriving from ethylene.

The polymer powder discharged from the second reactor was subjected to a steam treatment to remove the unreacted monomers, dried and melt blended in a Berstorff twin screw-extruder with 1800 ppm of Millad 3988. The composition had a MFR of 1.3 g/10 min, a total xylene soluble fraction of 12.6 wt %. The characterization data are reported on Table 2.

TABLE 2

|  |  | Ex. 1 | Ex. 2 | Ex. 3 | Comp. Ex. 1 | Comp. Ex. 2 |
| --- | --- | --- | --- | --- | --- | --- |
| Tm | °C. | 154.5 | 153.8 | 152 | 143.2 | 149.0 |
| Tc | °C. | 116.3 | 116 | 112.7 | 104.9 | / |
| Flexural Modulus | MPa | 870 | 830 | 890 | 840 | 790 |
| Izod at 23° C. | kJ/m² | 60.3 | 54 | 59 | 35.0 | N.B. |

TABLE 2-continued

|  |  | Ex. 1 | Ex. 2 | Ex. 3 | Comp. Ex. 1 | Comp. Ex. 2 |
| --- | --- | --- | --- | --- | --- | --- |
| Izod at 0° C. | kJ/m² | 34.6 | 37.3 | 28.6 | 6.0 | 4.0 |
| DBTT | °C. | −5.4 | −3.2 | −4.6 | 10.0 | −2.0 |
| Haze | % | 16.6 | 14.9 | 15.4 | 10.0 | 11.0 |
| Impact on bottles (4° C.) | cm | 126 | 121 | 144 | 62 |  |
| Top Load | N | 270 | 270 | 290 | 275 |  |

N.B. = not broken

Also after nucleation, the propylene polymers of the instant invention keep higher Tm and Tc values if compared to conventional propylene copolymers containing the same amount of comonomer. Moreover, it is evident from Table 2 that if the copolymers of the invention show superior impact properties, in particular at low temperatures which are in turn reflected on the blow molded articles.

The invention claimed is:

1. A gas-phase polymerization process carried out in at least two interconnected polymerization zones for preparing a propylene polymer comprising a total content of units derived from at least one linear or branched alpha-olefin comprising 2 to 8 carbon atoms other than propylene ranging from 4.7 to 5.5 wt %, and a melting temperature Tm (measured by DSC on the as-reactor polymer) ranging from 150° C. to 158° C.; said process comprising feeding propylene and ethylene to said interconnected polymerization zones in presence of a highly stereospecific heterogeneous Ziegler-Natta catalyst system under reaction conditions, and collecting a polymer product from said interconnected polymerization zones, wherein growing polymer particles flow upward through one of said interconnected polymerization zones, a riser, under fast fluidization conditions, leave said riser and enter another polymerization zone, a downcomer, through which the growing polymer particles flow downward under the action of gravity, leave said downcomer and are reintroduced into the riser, establishing a circulation of the growing polymer particles between the riser and the downcomer, whereby means are provided which are capable of totally or partially preventing a gas mixture present in the riser from entering the downcomer and a gas and/or liquid mixture comprising a composition different from the gas mixture present in the riser is introduced into the downcomer, the process further comprising:

a monomer feed ratio $C_x^-/(C_x^-+C_3^-)$ to the riser ranging from 0.055 to 0.70 mol/mol, wherein $C_x^-$ is at least one alpha-olefin comprising 2 to 8 carbon atoms other than propylene used as comonomer for preparing the propylene polymers, and $C_3^-$ is propylene.

2. The process according to claim 1 further comprising extrusion blow-molding the propylene polymer to form a blow-molded article, wherein the propylene polymer has a total content of ethylene ranging from 4.7-5.5 wt %, and a melting temperature Tm (measured by DSC on the as-reactor polymer) ranging from 150° C. to 158° C.

3. The process according to claim 1 further comprising melt blending up to 2500 ppm of at least one nucleating agent with the propylene polymer.

* * * * *